Nov. 28, 1967
F. J. SKROB
3,354,871
ROTARY INTERNAL COMBUSTION ENGINE
Filed Dec. 2, 1965
4 Sheets-Sheet 1
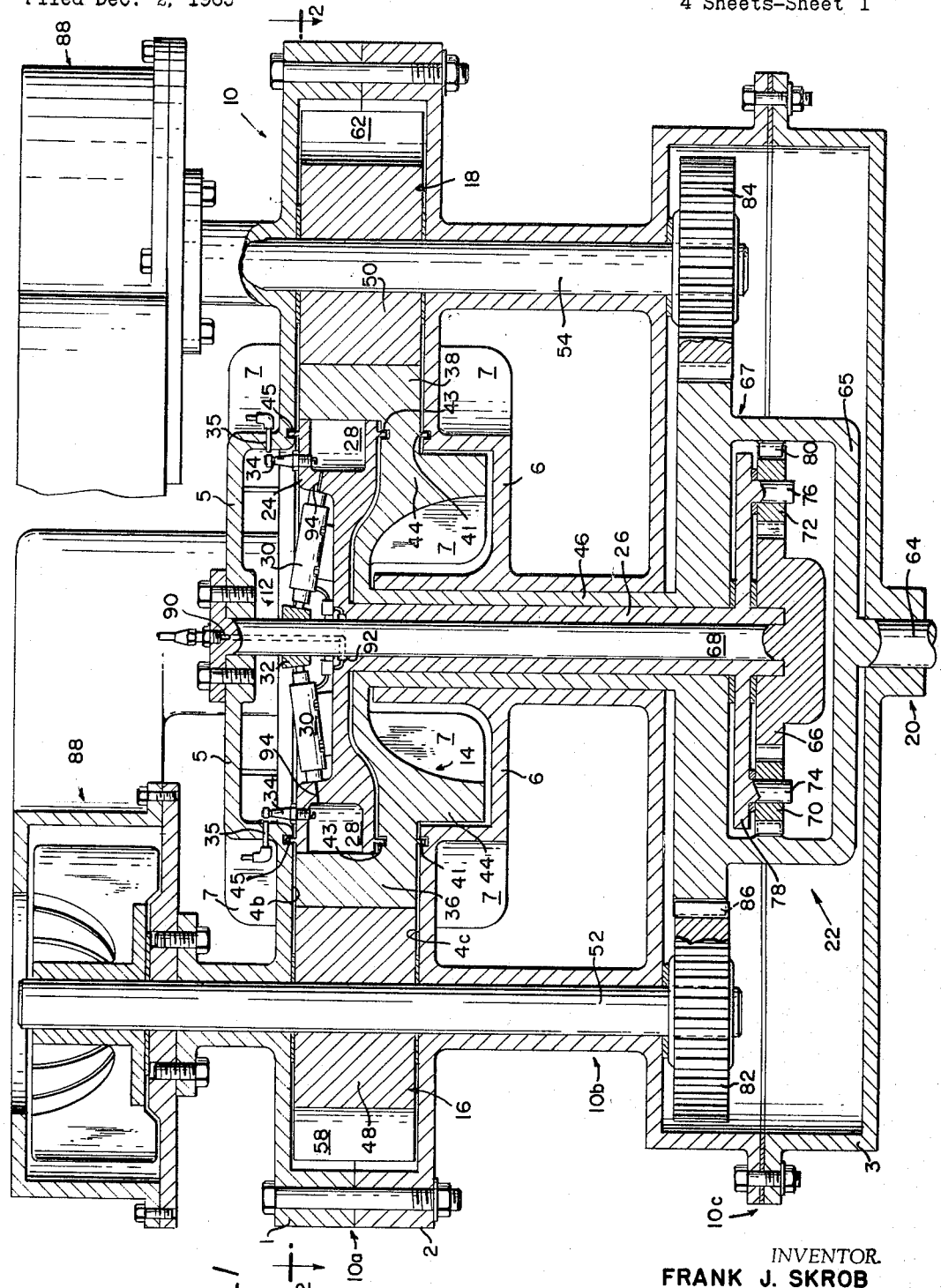
FIG__1
INVENTOR.
FRANK J. SKROB
BY
ATTORNEYS Nov. 28, 1967 F. J. SKROB 3,354,871
ROTARY INTERNAL COMBUSTION ENGINE
Filed Dec. 2, 1965 4 Sheets-Sheet 2
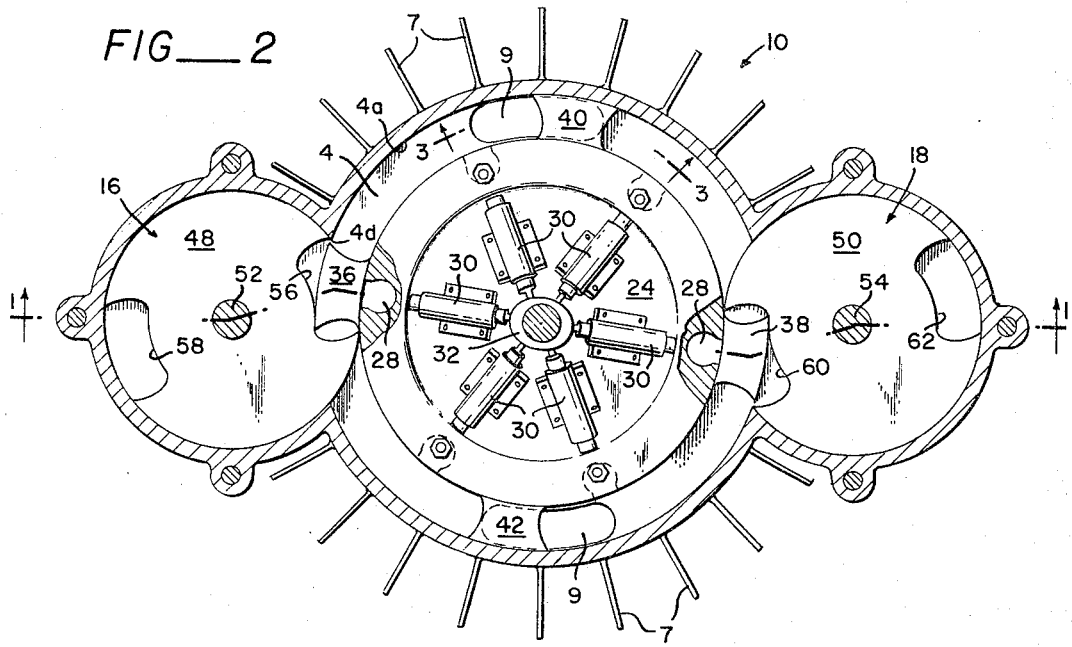
FIG__2
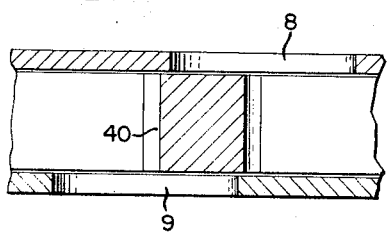
FIG__3
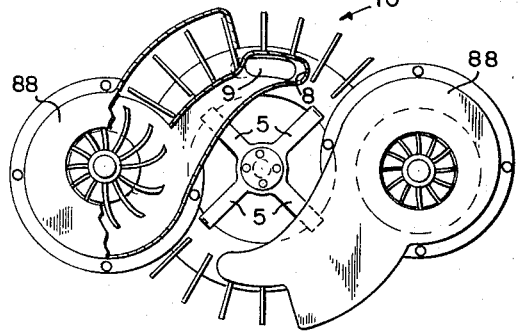
FIG__4
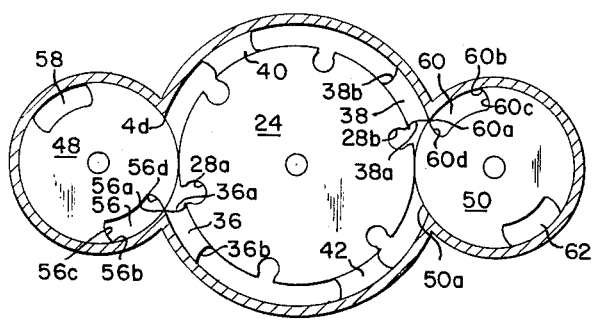
FIG__5A
FRANK J. SKROB
INVENTOR.
BY Seed & Berry
ATTORNEYS Nov. 28, 1967   F. J. SKROB   3,354,871
ROTARY INTERNAL COMBUSTION ENGINE
Filed Dec. 2, 1965   4 Sheets-Sheet 3
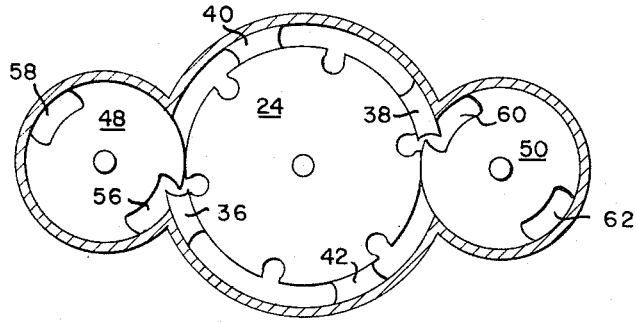
FIG___5B
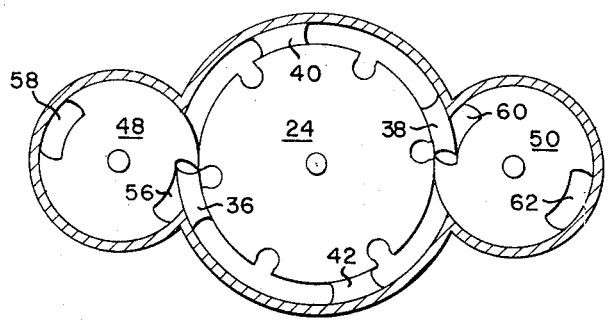
FIG___5C
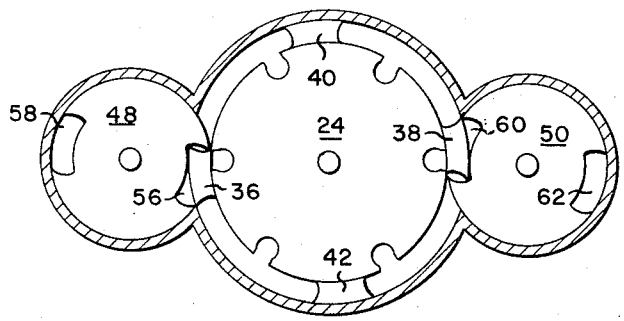
FIG___5D
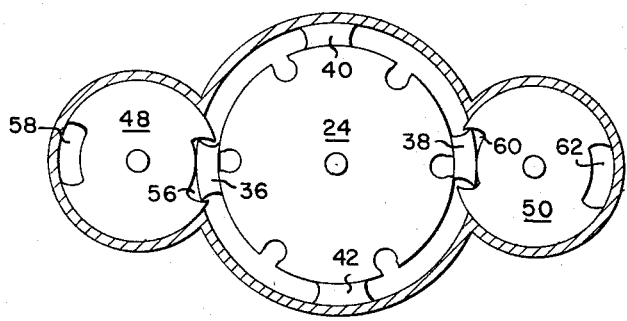
FIG___5E
FRANK J. SKROB
INVENTOR.
BY 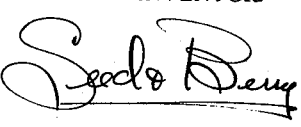
ATTORNEYS Nov. 28, 1967  F. J. SKROB  3,354,871
ROTARY INTERNAL COMBUSTION ENGINE
Filed Dec. 2, 1965  4 Sheets-Sheet 4
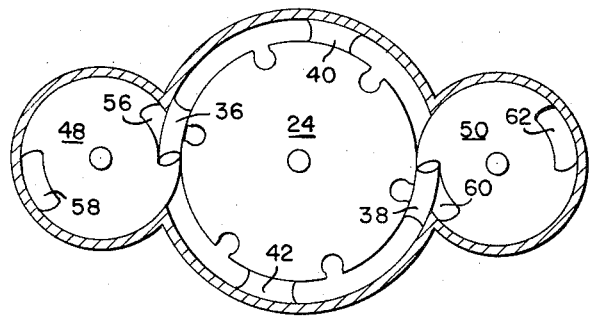
FIG__5F
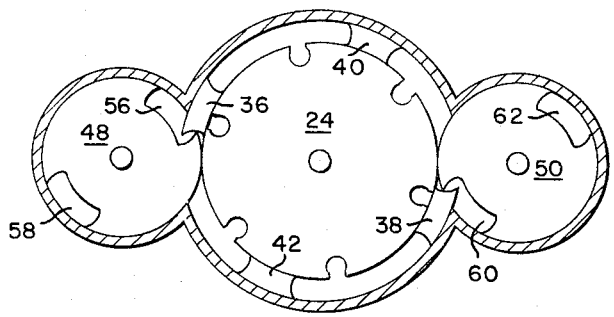
FIG__5G
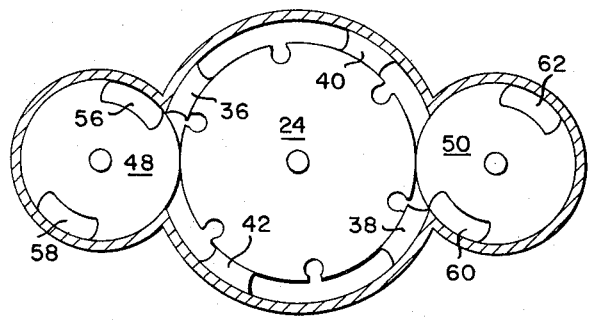
FIG__5H
FRANK J. SKROB
INVENTOR.
BY Seed & Berry
ATTORNEYS ced Nov. 28, 1967

United States Patent Office 3,354,871
Patented Nov. 28, 1967

3,354,871
ROTARY INTERNAL COMBUSTION ENGINE
Frank J. Skrob, Box 247, Twisp, Wash. 98856; George
M. Gibson, executor of said Frank J. Skrob, deceased
Filed Dec. 2, 1965, Ser. No. 511,142
13 Claims. (Cl. 123—13)

This invention relates to rotary internal combustion engines.

A primary object of this invention is to provide a rotary internal combustion engine having few major moving parts and a simple means of fuel and spark (if non diesel) distribution. Another object is to provide such an engine which achieves a large reduction of frictional power loss. Another object is to provide an engine having revolving pistons. Another object of this invention is to provide such an engine having a central rotor with combustion chambers therein which revolves in response to revolution of the pistons. A further object is to provide such an engine wherein rotary means cooperate with the periphery of a central rotor to provide compression and expansion zones in the engine. Another object is to provide an engine wherein the leading and trailing ends of the piston recess and pistons are contoured for cooperative meshing. These and other objects and advantages will become apparent from the following description taken in conjunction with the accompanying drawings, in which:

FIG. 1 is a cross-section view taken through an exemplary embodiment of this invention;

FIG. 2 is a cross-section view taken along the line 2—2 of FIG. 1 which further illustrates the invention;

FIG. 3 is a detail view in cross-section taken along the line 3—3 in FIG. 2 which illustrates a relationship between an intake and exhaust port;

FIG. 4 is an end view of the exemplary embodiment shown in FIGS. 1 and 2; and

FIGS. 5a–5h are schematic views sequentially illustrating the interrelationship of the major revolving parts of the invention.

The rotary engine of this invention comprises a housing having inlet and exhaust ports which communicate with an annular piston chamber, a central rotary means, planetary piston means with at least one piston revolvable around the periphery of the central rotary means within the annular piston chamber, a rotary cut-off means adapted to cooperate with the piston and central rotary means to provide compression and expansion zones in the annular piston chamber, power output means rotated by revolution of the planetary piston means, and means for rotating the central rotary means and the rotary cut-off means in response to revolution of planetary piston means such that the piston successively closes off the combustion chambers from the compression and expansion zones.

The central rotary means comprises a rotatably-mounted combustion rotor which, together with the housing, defines an annular piston chamber immediately surrounding the combustion rotor periphery. The combustion rotor contains a plurality of combustion chambers which open to the annular piston chamber. These combustion chambers are preferably located near the combustion rotary periphery.

The rotary cut-off means comprises a cut-off rotor rotatably-mounted in the housing to intersect the annular piston chamber and sweep, or wipe, the combustion rotor periphery such that the annular piston chamber is divided into the compression and expansion zones. The cut-off rotor contains at least one piston recess for receiving therein a piston of the planetary piston means to permit passage of the piston as it revolves around the combustion rotor. The leading and trailing ends of the piston and piston recess are contoured to be swept, or wiped, by leading and trailing edges of the other as the piston travels into and out of mesh with the piston recess so that the division of the annular piston chamber into compression and expansion zones is maintained as the piston travels past the rotary cut-off means. Two rotary cut-off means are preferably provided at diametrically opposite locations across the combustion rotor and at least two, and preferably four, pistons are also provided so that balanced compressions, combustions, and expansions can occur.

With reference to the figures, the embodiment of the invention shown comprises a housing 10, a central rotary means 12, a planetary piston means 14, two rotary cut-off means 16 and 18, power output means 20, and means 22 for rotating the central rotary means and the rotary cut-off means in response to revolution of the planetary piston means.

The housing comprises three peripherally flanged members 1, 2 and 3 that are bolted together about their peripheries to provide a combustion section 10a, a shaft support section 10b and a gear box section 10c. The combustion section contains an annular piston chamber 4 having an outer cylindrical side surface 4a and flat end surfaces 4b and 4c, and cut-off rotor chambers in which the rotary cut-off means rotate. The combustion section is generally annular-shaped with the outer side provided with reinforcing radial spider struts 5 and with the inner side connected to the shaft support section by spider struts 6. The provision of spider struts 5 and 6 opens the engine up to air cooling and cooling fins 7 are connected to the housing in proximity to the combustion zones to aid in removal of the heat of combustion. The inlet ports 8 and the exhaust ports 9 overlap slightly, with the inlet ports leading the exhaust ports, so that incoming air can scavage the exhausting gases from the expansion zone until a piston sweeps past and closes the overlapped portions.

The central rotary means 12 comprises a combustion rotor 24 with a cylindrical peripheral surface and a hollow shaft 26 axially connected to the combustion rotor. Combustion rotor 24 preferably comprises a central disc section and a thicker peripheral annular section, the central disc sections being provided as such to minimize heat conduction. Shaft 26 extends through the housing shaft support section into the housing gear box section. The peripheral section of the combustion rotor contains six combustion chambers 28 which are provided therein at uniformly spaced locations. These combustion chambers open outwardly into an annular piston chamber 4 within the housing combustion section. Six fuel injecting means 30 extend inwardly from respective combustion chambers to contact a suitable means such as cam 32 provided to operate the fuel injecting means. Each combustion chamber is provided with fuel igniting spark plug means 34 unless the engine operates on a diesel cycle in which case a compressed mixture of fuel and air would be self-igniting. Distributor points 35, connecting to secondary ends from an ignition coil (not shown), are located on the housing at diametrically opposite positions across the combustion rotor where ignition and combustion is to take place. Because the spark plugs revolve past the distributor points, the spark plugs serve as their own distributor.

The planetary piston means 14 comprises four piston sections 36, 38, 40 and 42 spaced 90° apart that revolve around the combustion rotor within the piston chamber and a fly wheel section 44 cast as an integral member with the piston sections, and a hollow shaft 46 axially connected to the fly wheel section. Shaft 46 concentrically encloses the combustion section into the housing gear box section. Suitable bearing assemblies would be provided to support the piston shaft 46 within the housing shaft support section and to support the combustion rotor shaft within the piston shaft. The radially inner and outer surfaces of the piston sections are curved and have substantially the same radii of curvature as the respective piston chamber side surfaces, such that the piston section will sweep, or wipe, those cylindrical surfaces in very close proximity thereto but without contact. The leading and trailing end surfaces of the piston sections are concave such that the piston sections will cooperatively mesh with piston recesses in the rotary cut-off means 16 and 18. This cooperative meshing occurs when the outer leading and trailing edges of the piston sections and the piston recesses sweep, or wipe, the end surface of the other.

The rotary cut-off means 16 and 18 comprises cut-off rotors 48 and 50 journal-mounted in the housing by means of shafts 52 and 54. The cut-off rotors are provided with two diametrically-opposed piston recesses, 56–58 and 60–62, in their peripheral edge sections which are adapted to cooperatively mesh with piston sections.

The central rotary means, planetary piston means, and the housing piston chamber are machined such that these components interfit without contact. The interfit between adjacent surfaces is sufficiently close that pressure seals exist as a result of boundary turbulence. To enhance boundary turbulence, adjacent surfaces are provided with interfitting annular steps and channels 41, 43 and 45. To further enhance boundary turbulence, adjacent surfaces could be roughened or otherwise made non-smooth so that close tolerances would not be as critical as might otherwise be required. Pressurized gases escaping through the tortuous paths provided by these steps and channels would lose substantially all of their energy before their escape. This provision of boundary turbulence seals eliminates any requirement for oil seals or other type of friction-producing seals which impair engine efficiency.

The spacing between adjacent surfaces radially inward of the annular steps and channels may be relieved so that no axial thrust will be created on any drive or driven shaft. By aligning the annular steps and channels at equal radial distances from the center of rotation, radial thrusts will be equalized throughout and thereby cancelled.

The power output means 20 comprises a drive shaft 64 connected to piston shaft 46 by means of spider strut members 65 axially connected to shaft 64, and member 67 having a circular end plate axially connected to shaft 46 and having a cylindrical side member connected to the outer ends of the spider strut members.

The means 22 for rotating the central rotary means and the rotary cut-off means comprises a non-rotatable sun gear 66 connected to a fixed shaft 68 that extends axially through the combustion rotor shaft and is attached to the spider struts 5, a pair of planetary gears 70 and 72 rotatably journaled by means of stub shafts 74 and 76 to a rotatable plate 78 connected to the combustion rotor shaft, and gears 82 and 84 mounted on shafts 52 and 54. The planetary gears 70 and 72 mesh with the sun gear teeth and with the teeth of an interior annular gear 80 provided on the cylindrical side of member 67, and the teeth of gears 82 and 84 mesh with the teeth of gear 86 on the peripheral edge of the circular end plate member 67.

Blowers 88 may be driven by the cut-off rotor shafts to force or draw air into the housing air intake ports, to force or draw air from the housing exhaust ports, and to blow air across the housing cooling fins all by appropriate ducting as shown in FIG. 4.

Fuel may be supplied to the fuel ignition means 30 through a duct 90 in the end of the fixed shaft 68 which communicates with an annular fuel distributing passage 92 in the center section of the combustion rotor 24. Each fuel injection means 30 communicates with the passage 92 and with a fuel discharge passage 94 leading to the respective combustion chamber.

Cam 32 has a tapered cam face and is mounted on fixed shaft 68 such that it can be shifted laterally with respect to the fuel injection means to regulate the fuel injection means 22. In plan view, cam 32 is oblong so that revolution of the fuel injection means therearound will automatically cause such means to inject fuel into the combustion chambers which are to be fired. Cam 32 can be rotated on shaft 68 to regulate the timing of the fuel injection means actuation.

The configuration of the curved leading and trailing end surfaces of the piston sections and of the cut-off rotor piston recesses are dependent upon the relative radii of the cut-off rotors and of the piston sections, and upon the relative rotational velocities of the cut-off rotors and the piston sections. One manner of cooperative meshing of the piston sections and the piston recesses together with the cooperative rotation of the combustion rotor is shown in FIGS. 5a–5h which depict advancing clockwise revolution of the piston sections about the central combustion rotor, clockwise rotation of the central combustion rotor, and counter-clockwise rotation of the cut-off rotors. The cut-off rotors in these figures revolve twice as fast as the piston sections and the central rotor revolves at ⅔ the speed of the piston sections.

In FIG. 5a, piston sections 40 and 42 are beginning to sweep the housing exhaust ports (shown in FIG. 3) and have just swept past the exhaust ports in FIG. 5h. At some intermediate point, e.g. as shown in FIG. 5e the piston sections 40 and 42 begin to sweep the housing inlet ports (shown in FIGS. 3 and 4). In FIG. 5a, piston sections 36 and 38 have just swept past the inlet ports and are compressing the air trapped between their leading ends 36a and 38a and the immediately exposed sections of the peripheral edge surfaces of the combustion rotor and of the cut-off rotors. As the piston sections 36 and 38 revolve from the position shown in FIG. 5a to the position shown in FIG. 5c, the leading edges 56a and 60a of the cut-off rotor piston recesses 56 and 60 sweep, or wipe, the leading end surfaces 36a and 38a thereby further compressing the entrapped air and forcing the compressed air into combustion chambers 28a and 28b which are rotated so that they are in position to receive the compressed air. In FIG. 5c, the inner surfaces of the piston sections 36 and 38 have trapped the compressed air into the adjacent combustion chambers 28a and 28b. At some point between the position depicted in FIGS. 5c and 5h, fuel is injected into combustion chambers 28a and 28b and ignited and the expanding combustion gases begin driving the piston sections from about the position shown in FIG. 5h where the piston section trailing ends begin to clear the combustion chamber openings. As the piston sections 36 and 38 revolve through the positions shown in FIGS. 5d–5f, the outer edges of the trailing ends 36b and 38b sweep, or wipe, the trailing end surfaces 56c and 60c of the cut-off rotor recesses 56 and 60, such that a closure is provided against which air can be compressed by revolution of the piston sections 40 and 42 toward the cut-off rotors. Simultaneously with the cut off of the annular piston chamber provided by the outer trailing edge of the piston sections 56 and 60, the outer leading edges of the piston sections 36 and 38 sweep, or wipe, the leading end surfaces 56d and 60d of the cut-off rotor recesses 56 and 60 such that a closure is provided to prevent exhaust gases behind piston sections 40 and 42 from escaping. The trailing edges 56b and 60b of the cut-off rotor recesses 56 and 60 sweep, or wipe, the trailing end surfaces 36d and 38d of the piston sections 36 and 38 during their traverse from the position shown in FIG. 5f to the position shown in FIG. 5h to provide a closure against which combustion gases expand to drive the piston sections forward. Finally, the trailing edges 56b and 60b of the cut-off rotor recesses begin to sweep, or wipe, past the leading outer edge 5d of the piston chamber as the piston sections are driven forward to maintain closure against which combustion gases continue to expand.

It will be noted that from the above-description of the manner of operation of this invention, the rotation of the combustion chambers must be at a slower speed than that of the piston sections. However, various gear ratios, number of piston sections, and number of combustion chambers can be employed which permit such relative rotational speed.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What is claimed is:

1. A rotary combustion engine which comprises:
    a housing having inlet and exhaust ports;
    a central rotary means rotatable in said housing and together therewith defining an annular chamber which communicates with said ports, said central rotary means having a plurality of combustion chambers communicating with said annular chamber;
    a planetary piston means having at least one piston member revolvable around said central rotary means in said annular chamber;
    a rotary cut-off means rotatable in said housing to intersect said annular chamber and sweep the rotary means such that said annular chamber is divided into compression and expansion zones, said rotary cut-off means having at least one piston recess for receiving said piston member therein to permit passage of said piston member thereby as said piston member revolves around said central rotary means;
    power output means adapted to be rotated by revolution of said planetary piston means;
    and means adapted to rotate said central rotary means and said rotary cut-off means in response to revolution of said planetary piston means such that said piston member successively closes off said combustion chambers from said annular chamber.

2. A rotary engine according to claim 1 wherein said rotary cut-off means comprises a cut-off rotor having at least one piston recess with leading and trailing ends provided in the periphery thereof; and wherein the leading and trailing ends of said piston member and the leading and trailing ends of said piston recess are contoured to be swept by leading and trailing edges of said piston recess and said piston member, respectively, to maintain division of said annular chamber into compression and expansion zones as said piston member travels into and out of mesh with said piston recess.

3. A rotary engine according to claim 1 wherein said central rotary means includes fuel injection means in communication with said combustion chambers.

4. A rotary engine according to claim 1 wherein said central rotary means includes a plurality of spark plugs, each mounted in communication with a combustion chamber; and wherein said housing includes ignition distributor points mounted to sequentially fire said spark plugs as such spark plugs are rotated in proximity thereto.

5. A rotary engine according to claim 1 wherein said central rotary means comprises a combustion rotor and a shaft axially connected to said combustion rotor; wherein said planetary piston means includes at least one piston member section, a flywheel section, and a hollow shaft axially connected to said flywheel section and concentrically enclosing the central rotary means shaft; and wherein said power output means and said means adapted to rotate said central rotary means and said rotary cut-off means are connected to the concentric shafts.

6. A rotary engine according to claim 1 wherein said central rotary means, said planetary piston means, said rotor cut-off means and said housing interfit without contact in a manner such that pressure seals in communication with said annular chamber are provided by boundary turbulence when said planetary piston means revolves.

7. A rotary engine according to claim 6 wherein adjacent surfaces on said housing, central rotary means, and said planetary piston means are provided with interfitting annular steps and channels to enhance boundary turbulence.

8. A rotary combustion engine which comprises:
    a housing having inlet and exhaust ports;
    a combustion rotor rotatably mounted in said housing and together therewith defining an annular chamber which communicates with said ports, said combustion rotor having a plurality of combustion chambers near the combustion rotor periphery communicating with said annular chamber;
    planetary piston means having a plurality of piston members equally spaced apart and revolvable around said combustion rotor in said annular chamber, each piston member having leading and trailing ends contoured to be swept by leading and trailing edges of cut-off rotor piston recesses;
    two cut-off rotors rotatably mounted in said housing at diametrically opposite locations across said combustion rotor to intersect said annular chamber and sweep the combustion rotor periphery such that said annular chamber is divided into compression and expansion zones, each cut-off rotor having two diametrically-opposed piston recesses in their peripheries adapted to receive said piston members as they travel into and out of mesh therewith so that division of said annular chamber into compression and expansion zones is maintained, each piston recess having leading and trailing ends contoured to be swept by leading and trailing edges of said piston members;
    power output means adapted to be rotated by revolution of said planetary piston means; and
    means adapted to rotate said combustion rotor and said cut-off rotors in response to revolution of said planetary piston means such that said piston members close off combustion chambers from said annular chamber.

9. A rotary engine according to claim 8 including a plurality of fuel injection means each communicating with a combustion chamber.

10. A rotary engine according to claim 8 including a plurality of spark plugs each mounted in communication with a combustion chamber, and including ignition distributor points mounted on said housing to sequentially fire said spark plugs as such spark plugs are rotated in proximity thereto.

11. A rotary engine according to claim 8 wherein said planetary piston means includes a flywheel section and four piston members spaced 90° apart and forming an integral unit with said flywheel section, and a hollow shaft axially connected to said flywheel section; and including a shaft axially connected to said combustion rotor and extending axially through the planetary piston means shaft; and wherein said power output means and said means adapted to rotate said combustion rotor and said cut-off rotors are connected to the concentric shafts.

12. A rotary engine according to claim 8 wherein said combustion rotor, piston members, said cut-off rotors, and said housing interfit without contact in a manner such that pressure seals in communication with said annular chamber are provided by boundary turbulence when said piston members revolve.

13. A rotary engine according to claim 12 wherein adjacent surfaces on said housing, combustion rotor, and said piston members are provided with aligned interfitting annular steps and channels to enhance boundary turbulence.

References Cited

UNITED STATES PATENTS 2,719,513   10/1955   Dezell _____ 123—13

MARK M. NEWMAN, *Primary Examiner.*

RALPH D. BLAKESLEE, *Examiner.*